Nov. 28, 1944.  E. M. ROEDER  2,363,551

ELECTRICAL ALARM AND TESTING SYSTEM

Filed June 28, 1941

INVENTOR.
EVERETT M. ROEDER

BY Herbert H. Thompson
HIS ATTORNEY.

Patented Nov. 28, 1944

2,363,551

UNITED STATES PATENT OFFICE 2,363,551

ELECTRICAL ALARM AND TESTING SYSTEM

Everett M. Roeder, Merrick, N. Y., assignor to Sperry Gyroscope Company, Inc., Brooklyn, N. Y., a corporation of New York Application June 28, 1941, Serial No. 400,165

2 Claims. (Cl. 177—311)

This invention relates to electrical alarm and testing systems. The invention as hereinafter described, is primarily adapted for use as a salinity indicating system, the same particularly constituting an electrically controlled alarm and measuring system by means of which the salinity conditions of a solution at different specific testing electrode locations may be observed. However, the system is capable of being utilized for indicating and measuring dangerous conditions of substances other than saline water and it is consequently not desired to specifically limit the invention in scope to such described usage.

An object of the invention is to obviate the necessity of manually resetting the contacts of the indicating or measuring meter in previously employed systems of this character in order to stop the alarm.

An important feature of the invention consists in provision in the improved system by which all of the different resistance elements or testing electrodes or cells employed are included in the alarm indicating system and the individual conditions at each element or cell location may be ascertained at the single measuring element of the system.

A further object of the invention is to make it unnecessary to search for the location of the particular cell or element instrumental in providing the alarm indication of oversaline or other dangerous conditions thereat.

The improved system permits the use of a relatively inexpensive indicating or measuring meter and does not require relays or rectifiers as previously employed in handling the alarm current in systems of this character.

Another feature of the invention consists in utilization of a flashing light indication for each of the condition testing elements or electrodes of the improved system to thereby clearly show the locations under alarm.

A further feature of the invention resides in provision in the system for individual compensation for the temperature of the observed solution or gas at the respective testing electrode locations.

Another important feature of the invention consists in provision in the system whereby the respective electrodes or elements remain on alarm even when the same are individually switched into the measuring meter circuit of the system for test readings.

Figure 1:
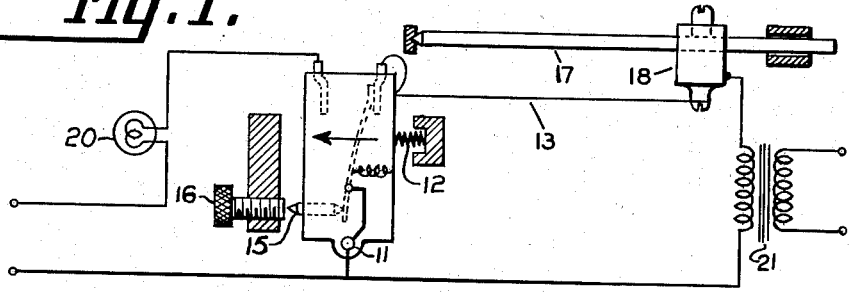
Figure 2:
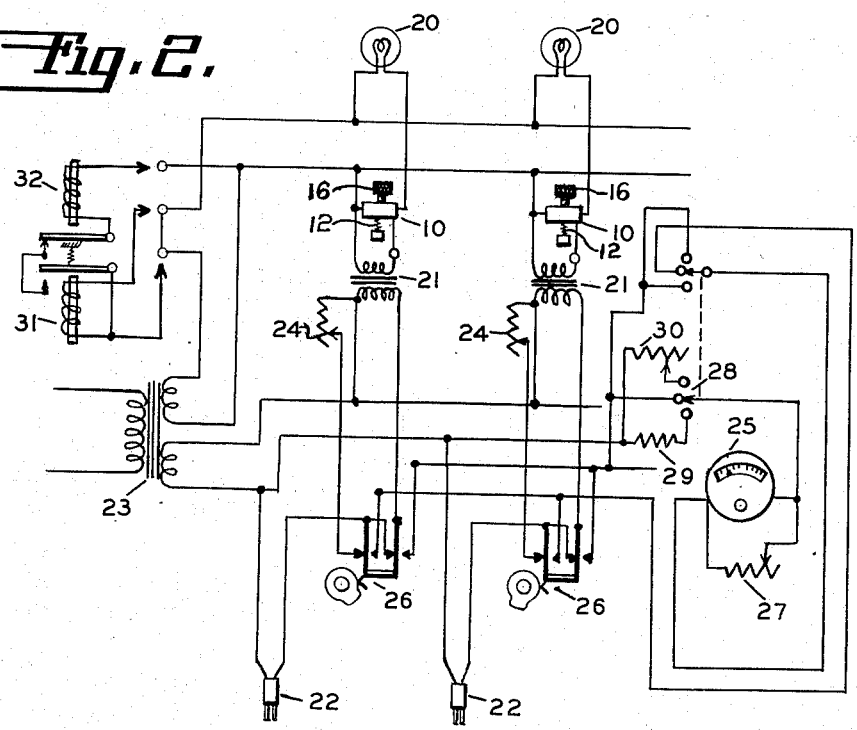

Other objects, features and structural details of the invention will be apparent from the following description when read in connection with the accompanying drawing wherein, Fig. 1 shows a detail circuit arrangement for the particular alarm circuit controlling switch employed with each of the electrodes in the improved system, and Fig. 2 shows a diagrammatic embodiment of the invention illustrating the improved arrangement of circuits and the elements therein which constitute the improved indicating system.

In Fig. 1, the preferred type of alarm circuit controlling switch employed in the improved indicating system is of the electrothermal relay type of single pole, double throw construction. This switch, the casing of which is designated at 10, as shown in this figure is positioned so that one of its terminals is closed to the common terminal thereof, the other individual terminal being normally open. Operation of the switch as hereinafter more particularly described causes reversal of the position of the single pole of the switch so that the same is closed at the normally open terminal thereof. The casing of the switch is pivoted at 11 and is pressed in the direction indicated by the arrow by a suitable compression spring 12. While the switch casing is urged to move in the indicated direction, it is restrained from such movement by means of a wire 13 one end of which is secured to the same, the wire being made of a material, such as stainless steel or nichrome, which has a large temperature coefficient of linear expansion and high resistivity as well as good corrosion resistance at elevated temperature. Also wire 13, as shown, is electrically connected to the normally closed terminal of the switch. In the depicted switch circuit, energy from transformer 21 will heat the wire 13, which forms a portion of the closed electric circuit, and cause the same to expand which permits the spring 12 to urge switch casing about its pivot 11 in the direction indicated by the arrow. The operating plunger 15 of the switch thereby contacts the face of an adjusting screw 16 and causes the switch mechanism to operate which breaks the connection to the wire 13 and opens the energy supplying circuit, and makes the connection to any circuit connected or controlled through the normally open terminal of the switch, which is the manner in which the switch is employed in the alarm circuit of the improved alarm and testing system.

When the relay or control circuit is open, the wire 13 cools and contracts to thereby restore the switch casing against the action of spring 12 to its original condition as heretofore described.

Operating cycles of the switch are continuous, the same occurring at a frequency determined by the setting of the adjustment screw 16 and the current supplied the relay circuit by way of transformer 21. Also inasmuch as the described switch device is purely resistive, alternating current of any frequency may be used to operate the same with identical results. A plunger operated single pole snap switch of the "Mu-switch" type is preferably employed.

Compensation for changes in ambient temperature at the switch is obtained with the use of a rod 17 made of the same material as the wire 13. One end of the wire 13 is secured to an anchor member 18 which is suitably fastened to the rod. Rod 17 is mounted in parallel relation to wire 13 and is free at one end of the same to permit expansion thereof with changes in ambient temperature. Other structural provisions for obtaining such compensation at the switch may be obviously employed.

With reference to Fig. 2, the improved salinity indicating or other system, in the embodiment thereof illustrated, includes an alarm circuit in which the described electrothermal relay switch 10 is employed. The alarm circuit is controlled by the switch, the circuit being normally open by the connection thereof to the normally open terminal of the switch. In the described system, individual switches 10 and indicating elements such as lamps 20 situated in the alarm circuit are provided for each of the testing elements or electrodes of the system. To effect operation of the respective switches, in the instant case, small transformers 21 are employed, the primary windings of which are connected to corresponding elements or electrodes 22 in the electrode circuit of the system in series with a suitable source of energy as herein provided by a main transformer 23. Shunted across each of the small transformers 21 in the electrode circuit is situated a rheostat 24 or other suitable current controlling device by means of which variance in temperature conditions at the respective electrodes 22 may be compensated for and each particular electrode is arranged to give an alarm indication when the saline conditions thereat, in this instance, for a given temperature reaches an arbitrary value of such as ten grains of sodium chloride per gallon of solution. The elements or electrodes 22 are of the electrical resistance providing type, the same being situated at different positions with respect to and in the substance under observation.

The secondary windings of the respective transformers 21, in this instance, are situated in the normally closed control circuit in which the respective switches 10 are included. Each of the switch controlled lamps 20 are situated in the alarm circuit which is connected to the normally open terminals of the respective switches 10 and to a source of electrical energy such as provided by transformer 23. The current flowing across the spaced terminals of the respective resistance elements or electrodes 22, or in the electrode circuit, upon application of a constant voltage thereon, is determined by the impedance of the windings of the transformers 21 and the resistance at the electrodes, which last factor is variable and is dependent upon the particular condition of salinity and temperature of the solution thereat in the instant case. A change in resistance at any particular electrode affects the value of the current in the associated electrode circuit and thus correspondingly influences the value of the current passing through the closed portion of the corresponding switch 10, the currents in the transformer coupled circuits being proportional to one another. By adjustment of the screw 16 the switches 10 may be set to operate cyclically at any desired value of primary current in the electrode or resistance element circuit of the system and thereby obtain a flash lighting indication at the associated lamps 20. Inasmuch as the value of the electrode current is a measure of the degree of salinity of the solution, at particular temperatures, at the respective electrodes, the alarm circuit of the system may be set to be closed by the switches 10 for given electrodes and the desired corresponding alarm indication obtained.

The improved system also includes a testing circuit associated with said electrode and alarm circuits, the same having a current measuring meter 25 therein, calibrated to give an indication of degrees of salinity in grains of sodium chloride per gallon in the present instance. Switching means of the rotary controlled type, such as indicated at 26 is employed with each of the resistance elements or electrodes 22, control the circuits of the system so that individual electrodes are situated in both the alarm and testing circuits. The single meter 25 employed with the system is shunted by a settable rheostat element 27 or other current controlling device and the respective switching means 26 are so arranged as to cut out the individual rheostats 24 for given electrodes or cells in the system when the cell and testing circuits are connected. Consequently, the single variable shunt for the meter is the only accurately calibrated rheostat required. In the improved system, all the cells remain on alarm at all times, and the arrangement makes it possible to obtain measurement of over-saline or other conditions at particular cells even when the same are giving an alarm indication. It is also clear that as now provided for it is no longer necessary to manually reset the contacts of the measuring meter or other indicator after an alarm indication is given.

A suitable three-position double switch 28 may be utilized in the testing circuit of the system to obtain a check on the meter. The meter checking positions of the switch are to either of its outside arm terminals, in which instance the cells are cut out of the circuit and either the calibrated resistance element 29 or the variable resistance 30 takes its place to provide the check on the indications shown on the meter.

A relay 31 and buzzer 32 arrangement of a suitable type may also be employed in the alarm circuit, if desired, to supplement the visible alarm indication given by the trouble locating lamps 20. In the modification shown in Fig. 2, the buzzer 32 is operable upon the energization of the visible indicating device 20 in the following manner. When the indicating circuit is closed by the switch 10, the winding of relay 31 is energized, thereby attracting its armature to close a circuit which in turn energizes the buzzer 32 from the secondary winding of transformer 23 to produce the audible signal.

While only two testing elements or electrodes 22 and the required complementary devices therewith in the system are illustrated in the drawing, it will be understood that any desirable number of the same may be employed without departing from the inventive concepts herewith disclosed.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereafter claimed.

What is claimed is:

1. An electrical salinity indicating system having a circuit including a plurality of salinity condition testing electrodes therein, said electrode circuit having individual current controlling devices for each of said electrodes settable to compensate for variance in temperature conditions at the respective electrodes, an alarm circuit, associated with said electrode circuit, having individual indicating elements therein for each of the electrodes of the system, a normally open testing circuit having a single meter therein and a single adjustable current controlling device by means of which the salinity conditions at the temperature of the respective electrodes may be individually measured, a source of electrical energy for said system, and switching means for each of said electrodes connecting said electrode and testing circuits adapted to cut out only that portion of the electrode circuit containing the individual current controlling device for the particular electrode being tested.

2. An electrical salinity indicating system having a circuit including a plurality of salinity condition testing electrodes therein, said electrode circuit having individual shunt portions containing a rheostat for each of said electrodes settable to compensate for variance in temperature conditions at the respective electrodes, an alarm circuit having a normally open relay switch and individual indicating elements therein for each of the electrodes of the system, a normally open testing circuit having a single meter and a single rheostat, shunted across said meter, by means of which the salinity conditions at the temperature of the respective electrodes may be individually measured, a source of electrical energy for the system operative upon existing oversalinity conditions for a particular electrode to close the associated relay switch and thereby obtain a trouble designating indication from the indicating element in the alarm circuit associated with said electrode, and switching means for each of said electrodes connecting said electrode and testing circuits adapted to cut out only that portion of the electrode circuit containing the rheostat for the particular electrode being tested thereby facilitating measurement of salinity conditions at particular electrodes while the system gives an alarm indication.

EVERETT M. ROEDER.